(12) United States Patent
Lissek et al.

(10) Patent No.: US 9,510,090 B2
(45) Date of Patent: Nov. 29, 2016

(54) DEVICE AND METHOD FOR CAPTURING AND PROCESSING VOICE

(75) Inventors: Herve Lissek, Renens (CH); Philippe Martin, Lausanne (CH); Jorge Carmona, Pully (CH); Michel Imhasly, Fiesch (CH); Ian Millar, Curtilles (CH); Xavier Falourd, Lausanne (CH); Patrick Marmaroli, Thonon-les-Bains (FR); Gilbert Maitre, Les Hauderes (CH)

(73) Assignee: VEOVOX SA, Pully (CH)

( * ) Notice: Subject to any disclaimer, the term of this patent is extended or adjusted under 35 U.S.C. 154(b) by 179 days.

(21) Appl. No.: 13/483,904

(22) Filed: May 30, 2012

(65) Prior Publication Data

US 2012/0330653 A1 Dec. 27, 2012

Related U.S. Application Data

(63) Continuation of application No. PCT/EP2010/068649, filed on Dec. 1, 2010.

(30) Foreign Application Priority Data

Dec. 2, 2009 (CH) ..................................... 1848/09

(51) Int. Cl.
*H04R 1/40* (2006.01)
*H04M 1/03* (2006.01)
(Continued)

(52) U.S. Cl.
CPC ............. *H04R 1/406* (2013.01); *H04M 1/035* (2013.01); *H04M 1/6008* (2013.01); *H04R 3/005* (2013.01); *H04R 2410/05* (2013.01)

(58) Field of Classification Search
CPC .. H04R 1/406; H04R 3/005; H04R 2410/01; H04R 2410/05; H04R 2430/21; H04R 2430/23; H04R 2201/40; H04R 2201/403; H04R 1/20; H04R 1/32; H04R 1/326; H04R 1/40; H04R 25/405; H04M 1/035; H04M 1/6008; G10L 21/0208; G10L 2021/02165; G10L 2021/02166
USPC ........... 381/356, 365, 366, 333, 334, 91, 92, 381/94.7, 110, 122
See application file for complete search history.

(56) References Cited

U.S. PATENT DOCUMENTS 5,473,701 A * 12/1995 Cezanne et al. ................ 381/92
7,110,963 B2 9/2006 Negreiro
(Continued)

FOREIGN PATENT DOCUMENTS

EP 0 694 833 A1 1/1996
JP A-4-324324 11/1992
(Continued)

OTHER PUBLICATIONS

Elko, "Superdirectional Microphone Arrays," *Acoustic Signal Processing for Telecommunication*, pp. 181-235, Kluwer Academic Publishers, 2000.
(Continued)

*Primary Examiner* — Vivian Chin
*Assistant Examiner* — Jason R Kurr
(74) *Attorney, Agent, or Firm* — Oliff PLC

(57) ABSTRACT

A portable voice capture device having an orientable arm comprising a first leg and a second leg, the first leg and the second leg having different orientations, the first leg of the first arm comprising a first differential linear array of microphones, a directivity of the first differential linear array being arranged for improved sensing of voice from a user, the second leg of the arm comprising a second differential linear array of microphones, a directivity of the second differential linear array being arranged for improved sensing of noise from a different than the direction of said sensed voice, and a noise reduction circuit for providing a voice signal with reduced noise, based on the output of the first array and on the output of the second array.

13 Claims, 6 Drawing Sheets

(51) Int. Cl.
  *H04M 1/60* (2006.01)
  *H04R 3/00* (2006.01)

(56) References Cited

U.S. PATENT DOCUMENTS

| | | | |
|---|---|---|---|
| 7,120,477 B2 | 10/2006 | Huang | |
| 7,366,662 B2* | 4/2008 | Visser et al. | 704/227 |
| 7,657,038 B2* | 2/2010 | Doclo | G10L 21/0208 379/406.01 |
| 7,957,972 B2* | 6/2011 | Huang et al. | 704/260 |
| 8,184,815 B2* | 5/2012 | Kawano | 381/26 |
| 8,494,177 B2* | 7/2013 | Burnett | G10L 21/0208 381/92 |
| 2002/0007315 A1 | 1/2002 | Rose | |
| 2003/0118205 A1* | 6/2003 | Bodley et al. | 381/356 |
| 2003/0125959 A1 | 7/2003 | Palmquist | |
| 2005/0026560 A1* | 2/2005 | Villaverde et al. | 455/3.06 |
| 2005/0074129 A1 | 4/2005 | Fan | |
| 2007/0165879 A1 | 7/2007 | Deng et al. | |
| 2008/0013758 A1 | 1/2008 | Tsai et al. | |
| 2008/0310649 A1* | 12/2008 | Yamada | 381/92 |
| 2010/0171743 A1* | 7/2010 | Hata | 345/440 |

FOREIGN PATENT DOCUMENTS

| | | |
|---|---|---|
| JP | A-2007-27939 | 2/2007 |
| JP | A-2009-188641 | 8/2009 |
| JP | A-2009-260418 | 11/2009 |

OTHER PUBLICATIONS

Kim et al., "A New Approach for Rustle Noise Canceling in Pen-type Voice Recorder," *IEEE Transactions on Consumer Electronics*, vol. 49, No. 4, Nov. 2003, pp. 1118-1124.

Yilmaz et al., "Blind Separation of Speech Mixtures via Time-Frequency Masking," *IEEE Transactions on Signal Processing*, vol. 52, No. 7, Jul. 2004, pp. 1830-1847.

Mar. 28, 2011 International Search Report issued in International Patent Application No. PCT/EP2010/068649.

* cited by examiner

DEVICE AND METHOD FOR CAPTURING AND PROCESSING VOICE

The present application is a continuation of international application PCT/EP2010/68649, filed on Dec. 1, 2010, the contents of which is included hereby by reference. It claims priority from Swiss patent Application CH2009/1848, filed on Dec. 2, 2009, the contents of which is included hereby by reference.

FIELD OF THE INVENTION

The present invention relates to a device and method for capturing and processing voice, especially in noisy environments. The invention relates among other to a mobile device which can be used in noisy environments such as, without limitation, in restaurants for capturing and processing voice, and for performing speech recognition.

PRIOR ART

While the recognition rate of speech recognition algorithms improved recently, it remains low under difficult conditions, notably when the signal to noise ratio is insufficient. For this reason, capturing and recognizing voice in noisy environments remains difficult or unreliable.

However, there is a need for devices able to perform reliable speech recognition even in very noisy environments, such as (without limitations) in bars and restaurants. For example, it would be useful to have a device able to capture and recognize the voice of a waiter in a restaurant, and to use this device for taking, recognizing and transmitting voice-orders.

U.S. Pat. No. 7,110,963, the content of which is incorporated by reference, discloses a speech recognition system for enabling a waiter in a restaurant to transmit commands to the kitchen. A speech recognition software application is used for controlling the processing and data flow during order taking operations and to receive order information from the server in real time during interaction with the customer.

US-A1-2002/0007315, the content of which is hereby incorporated by reference, discloses another voice activated order system for a fast food restaurant, where food orders are entered in a point-of-sale register and converted into voice messages for the restaurant food preparer. A speech-to-text converting circuit is used in the point-of-sale for entering voice commands.

The above mentioned solutions are useful and allow for a faster and more natural transmission of orders between the restaurant and the kitchen. However, the reliability of the speech recognition in many restaurants with a high or even average level of noise is unsatisfactory; the signal-to-noise ratio is not sufficient for existing speech recognition algorithms to perform reliably.

It has been found that the quality and directivity of the microphone is of paramount importance for capturing a good quality voice signal. US-B2-7120477 (Microsoft Corporation) describes a personal mobile computing device having an antenna microphone and speech detection. The antenna comprises a microphone positioned on its distal end and is adapted to be oriented toward a user, thereby reducing the distance between the mouth of the user of the microphone while the device is held in the palm of the user's hand. Reducing this distance helps to increase the signal-to-noise ratio of the speech signals provided by the microphone. However, this solution is still insufficient for very noisy environments.

Another module for capturing voice in noisy environments is disclosed in EP694833. This document describes a first beam steerable microphone array for capturing voice, and of an additional beam steerable microphone array for recognizing additional sources of audio data and sources of noise and/or interference. The aim here is to locate the speaker (audio source) with a triangulating algorithm, and to command a mechanical drive system for directing the focus of a video camera toward the speaker.

Both microphone arrays are bidimensional and thus occupy a large surface; it is thus not possible to mount the arrays on a linear beam while keeping a sufficient distance between microphones. Moreover, the post-processing of the audio signals delivered by two multidimensional arrays of microphones is difficult and requires a lot of circuitry or processing power, increased power consumption, and will often result in an undesired filtering of the output signal.

There is therefore an aim of the present invention to develop an improved hand-held device which is able to capture and process voice, and to generate a voice signal with a signal to noise ratio sufficient for reliable speech-recognition applications.

Another aim of the invention is to develop a microphone-based device able to enhance the sensing of the user's voice while minimizing the background noise and the possible parasitic speakers in diffuse conditions.

The performances of the device should cover at least the mean voice bandwidth, but should also be extended so as to enhance the speech recognition process, namely [300 Hz-6 kHz].

Another aim is to develop a device capable of extracting useful voice information (such as a command or an order in a restaurant) out of the background noise which can be more or less diffuse (no privileged incidence angle), more or less intense (in terms of sound pressure levels) and of various spectral characteristics (amplified music, individual voices, "cocktail noise", etc.).

Another aim is to develop an improved device for sensing voice from the mouth of the speaker and noise from other directions, and which can be held in the palm of the user's hand.

BRIEF SUMMARY OF THE INVENTION

According to one aspect of the invention, a portable voice capture device comprises:

an orientable arm adapted to be oriented toward a user's mouth, said arm comprising a first differential linear array of microphones, the directivity of said first array being arranged for sensing voice from said user's mouth;

a second differential linear array of microphones, the directivity of said second array being arranged for sensing noise from a different direction than the user's mouth;

a noise reduction circuit for providing a voice signal with reduced noise, based on the output of said first array and on the output of said second array.

In a preferred embodiment the device is a hand-held device. In another embodiment the device can be connected with other equipments, including without limitations fixed PC, laptops, work stations, other mobile devices such as mobile phones and other devices. In a preferred embodiment, the first differential array is used for capturing background noise from a back direction.

Differential arrays of microphones are known as such, and described for example in Elko, G. W., "*Superdirectional Microphone Arrays*", In J. Benesty and S. Gay (eds), "Acoustic Signal Processing for Telecommunication", pp.

181-236, Kluwer Academic Publishers, 2000. Most microphone arrays are relatively bulky and not adapted to portable devices.

The present invention relates to a specific arrangement of linear arrays, which allows to capture sound along to different directions. The user can orientate the arm toward his mouth, and make sure that the first direction is adapted for capturing the user's voice, while the second direction captures essentially background noise. The noise reduction circuit may then improve the voice signal by removing the background noise, using for example coherence techniques.

In one embodiment, the first array of microphones captures voice in one first front direction and background noise from a back direction, while the second array of microphones captures background noise and other voices from the right and the left.

Other embodiments may use more than two arrays of microphones, and/or complex arrays in order to give a better control over the directivity of the device. The microphones are preferably, without limitations, electrets microphones.

In one embodiment, the arm is L-shaped, and comprises one linear array of microphones on each of the two branches. Other arrangements, including microphones with a plurality of non perpendicular branches, U-shaped microphones with three arrays of microphones, or arrangements with pairs of microphones on different branches of a common arm, may also be used within the invention.

According to another, possibly independent aspect of the invention, the voice signal output by the microphone is post-processed by a post-processing filter comprising a plurality of layers of signal processing, allowing the extraction of the voice out of the noise, reducing residual noise, and assessing the coherence of the resulting signal with the original voice sensing.

According to another aspect, an additional automatic voice activity detector enable further enhancement of the signal by removing time segments during which no voice activity is detected.

Voice signal post processing techniques are known as such and described for example by Kim K M, Choi Y K, Park K S, "A new approach for rustle noise cancelling in pen-type voice recorder", IEEE Transactions on Consumer Electronics, Vol. 49 (4), pp. 1118-1124, November 2003. Another example of post processing method is described by O. Yilmaz and S. Rickard, "Blind Separation of Speech Mixtures via Time-Frequency Masking", IEEE Transactions on Signal Processing, Vol. 52 (7), pp. 1830-1847, July 2004. The specific combination of methods described and claimed has been tested to be particularly effective for the above mentioned purpose, and proved to be effective for removing noise for a voice signal captured with the specific microphone described and claimed in this application, while avoiding unnecessary hardware and software components required by more complex arrangements.

A key advantage of the device disclosed in the description and in the claims is its ability to adjust the directivity in order to capture and recognize voice from a comfortable distance; the speaker can speak at a comfortable distance (greater than 10 cm, preferably greater than 15 cm even in noisy conditions, such as in a restaurant) from the handheld device.

In one preferred embodiment, the microphone array is small enough to guarantee the ergonomic and portability of the system, and does not exceed the dimensions of common PDAs or Pocket PCs (roughly 150 mm×70 mm, in any case lower than 180×100 mm).

BRIEF DESCRIPTION OF THE FIGURES

The present invention will be better understood with the description of some embodiments illustrated by the figures in which.

DETAILED DESCRIPTION OF THE PREFERRED EMBODIMENTS

The following description is given with an emphasis on the pocket-PC based embodiment for voice-order taking in restaurants. However, the device of the invention may also be used with other equipments, including without limitations fixed PC, laptops, work stations, other mobile devices such as mobile phones and other devices, and for other applications than restaurants and bars (hospitality industry, hospitals, entertainment industry, groceries, laboratories, etc.).

Figure 1:
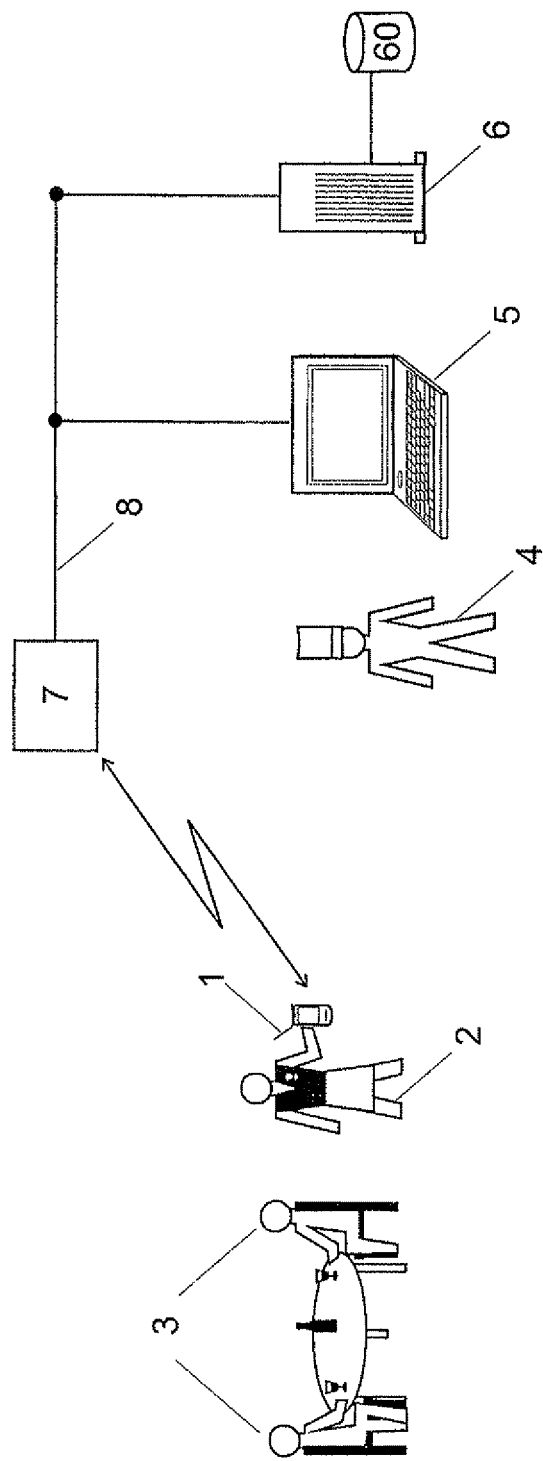
FIG. 1 schematically illustrates a system for capturing and transmitting voice orders in a restaurant.

An example of environment in which the method and device can be used is illustrated on FIG. 1. In this setting, a waiter 2 in a bar or restaurant takes order from customers 3 sitting at a table. The waiter repeats each order and speaks them in the microphone of his mobile device 1. In this embodiment, the recorded voice signal is locally post-processed, for example by the processor of the mobile device 1 or by dedicated processing means, in order to improve the signal-to-noise ratio. This post-processing could also be done by a remote computer or server in another embodiment, although this is likely to introduce a delay. The processed voice signal is then transmitted over the air to an access point 7, using a standard wireless communication protocol such as 802.11, Bluetooth, etc. The access point 7 belongs to a local area network 8 (LAN), to which various other equipments such as a personal computer 5, a server 6, etc are connected. The voice signal received from the access point 7 is converted into text commands by the server 6 which runs a speech recognition algorithm. The speech recognition algorithm could be executed by the mobile device if this device has enough processing power; this may however make an update of the speech and language models (such as the list of commands to recognize, and associated grammar) more difficult.

In a preferred embodiment, the speech recognition is speaker dependant and uses speaker dependant templates stored in a database 60. In this database 60 are stored a dictionary and a grammar for limiting the number of words or expressions to be recognised, and for defining some rules characterizing the text spoken by the waiter. This grammar is advantageously updated each time new items are proposed to the clients 3, for example each time the restaurant's menu is modified. The grammar and the dictionary are advantageously adapted for "command and control" applications, and/or for order taking in restaurants.

For this application, the speech recognition algorithm is advantageously based on a statistical classifier, such as a neural network, combined with a template based classifier. Tests have shown that this setting provides for an improved recognition rate and easy introduction of new words or expressions in the grammar. The grammar may include template recognition units of different sizes (phrase, sentence, word, phoneme). A user dependant grammar can also be used.

The grammar and/or the classifier are preferably adaptive, and learned template recognition units embedded in spoken input. This enables online learning of new words or other templates. User feedback may be used, for example into the user's device, for introducing or selecting the text equivalent of a newly learned template.

Furthermore, the grammar is advantageously arranged into separate categories and sub-categories; this improves the quality of the speech recognition since the system knows the category of the next template he expects. This also makes the manual introduction of new templates easier. For example, one category of templates may correspond to the list of wines, and another category to the desserts.

The text recognised by the speech recognition system in the server 6 is transmitted through the LAN 8 and over the wireless channel back to the waiter's device 1, and displayed in real-time. In another environment, the recognition could be done directly on the waiter's device. The waiter can check if the recognition was correct, and confirm or correct the command recognised by the server and displayed by the device. This user's feedback can be used for adapting the speaker dependant template, the grammar, and/or to add new recognition units.

When the confidence level reached by the speech recognition algorithm is under a predefined level or when there are several possible options that are very close to one another, a menu with a multiple choice list of the most likely inputs is displayed to the waiter, who can choose the intended command in this menu, using for example a touchscreen, a stylus, or any other suitable input means including voice. The waiter can also select other options, for example to specify the amount of items ordered (number or volume), the type (for example a wine's vintage, client's preferences for the cooking, etc), depending on the ordered item or if the initial order was not precise enough.

Once validated by the waiter, this text, and the reply of the waiters to the option's menu, is also displayed on a personal computer 5 or printed and read by the staff of the restaurant, in order to prepare and deliver the requested order. In another embodiment, this text is spoken in the kitchen. The list of ordered items may be stored in a database of the server 6, which can be used later for preparing the bill to the customer. In an alternative embodiment, the recorded voice signal is post-processed by a computer or server.

In one alternative embodiment, the speech recognition is performed locally, in the user's device 1. This requires however devices 1 with more processing power, and a more difficult synchronisation of the speaker dependant models if one user uses several different devices.

Figures 6, 7:
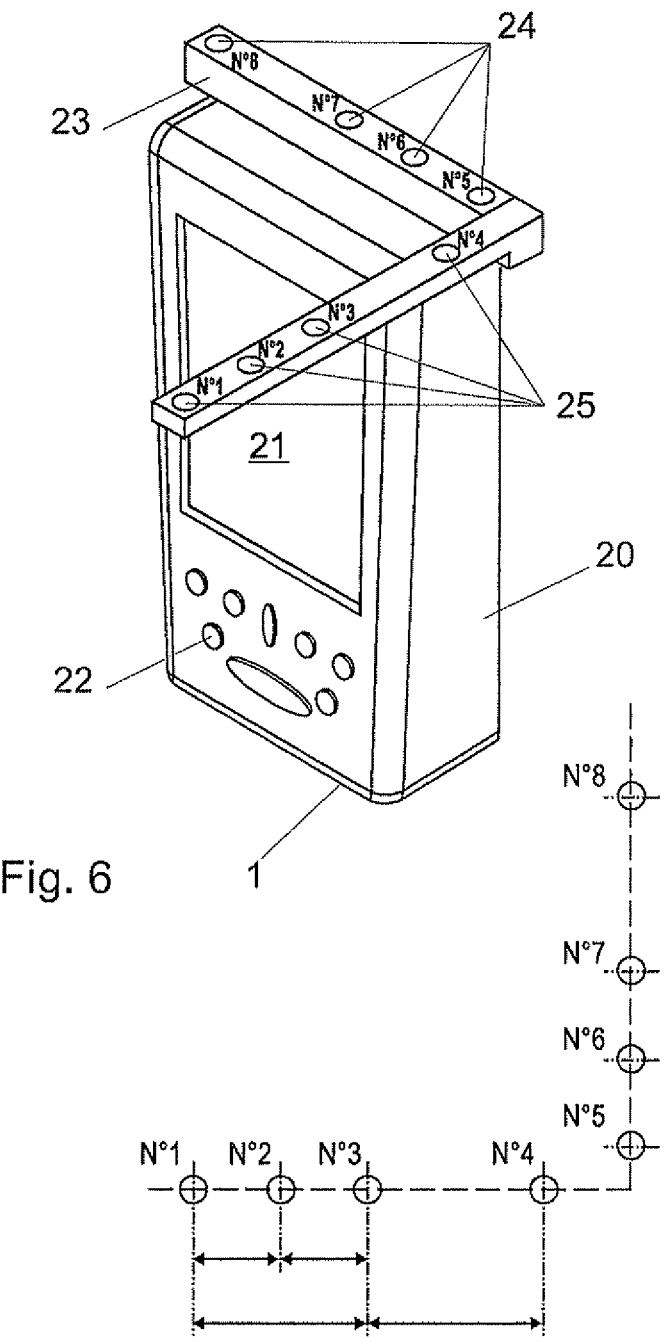
FIG. 6 illustrates an example of device comprising a two-dimensional differential microphones set-up (left: broadside array; right: endfire orientable array).
FIG. 7 schematically illustrates the arrangement of microphones on the device of FIG. 6.

An example of device 1 according to the invention is illustrated on FIG. 6. It is advantageously built around a standard PDA (personal digital assistant), netbook or similar device. It comprises:

- A case adapted for carrying and manipulating the device in the user's hand;
- A display 21 for displaying to the user 2 the recognised text, and other text or images;
- Haptic means 22, such as a keypad, keyboard, touch button, jog wheel, etc;
- A communication interface (not shown), for example a WLAN and/or Bluetooth interface;
- Processing means (not shown), such as a microprocessor with a suitable volatile and non-volatile memory, for audio-processing the audio signal captured with the microphone, and for executing other programs and functions;
- An orientable L-shaped arm 23 including several linear arrays of microphones 24, 25 with different spacing between the microphones in each array. The use of a plurality of arrays of microphones provides for an enhancement of the voice sensing, and broadband directivity control. The arm is connected to the case over a rotatable link, in order to direct the longest leg precisely toward the mouth of the speaker.

The arm 23 is advantageously an add-on which is adapted for "later" installation and semi-permanent mounting on an existing mobile device. Electronic circuitry, such as analog-to-digital converters, delays, adders, etc and/or digital signal processors (DSPs) or FPGAs may be operatively associated with this arm for processing audio signals output by the arrays of microphones. This add-on (removable arm with optional circuitry) can be sold separately from the mobile device, and installed later on an existing mobile device in order to transform it into a device according to the invention. The installation may also include installation of suitable drivers and application software in the mobile device, for retrieving signals from the add-on, post-processing those signals, sending them to the remote server or to the mobile device, and displaying the feedback from the server. The electric connection between the arm and the device preferably uses an existing interface of the mobile device, for example a USB, a RS-232 or proprietary socket, or a wireless connection.

In another not illustrated embodiment, the arm with the arrays of microphones and the associated electronic circuitry is connected to an existing mobile device over a wireless interface, for example a Bluetooth or Zigbee interface. In this case, the arm may be detached from the mobile device, and manipulated separately. It is also possible to split the arm in several parts, and to use one of the legs as a stylus held towards the mouth and connected (wirelessly or by wire) to the other parts and/or to the mobile device. Moreover, the arm, or each part of the arm, may be an entirely passive component that includes only microphones, or an "intelligent" part having a microprocessor, a FPGA or a signal processor. The different parts can be mutually connected, and connected to the mobile device and/or to a receiving module of the mobile device, over a wired or wireless interface. Moreover, the microphone or microphone parts, and/or the mobile device, can be remotely connected from a remote control module for controlling the amplification, the noise reduction, the directionality etc. In one embodiment, the system comprises signal processing means which are split between the arm, or between different parts of the arm, and the mobile device.

Figure 2:
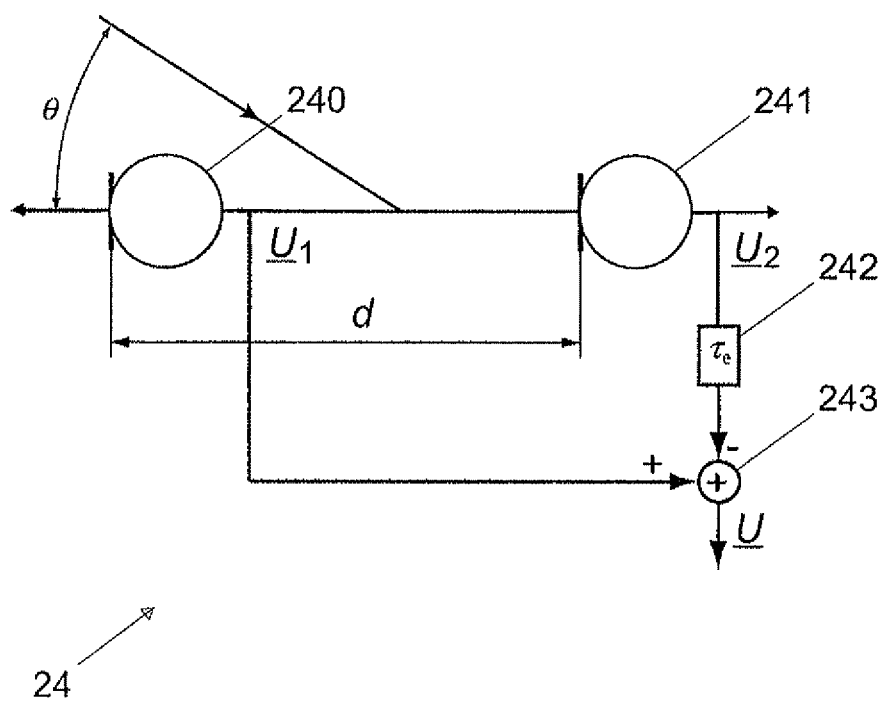
FIG. 2 schematically illustrates a sub-system of microphones.

An example of linear array of microphones 24 is illustrated on FIG. 2. This simple array comprises two microphones 240, 241 spaced by a distance d. The output signal of one microphone is algebraically added with an adding element 243 to the delayed output signal of the other microphone distant of d, the delay applied by the delaying element 242 being denoted $\tau_e$. This array forms a beamforming system; a suitable choice of delay $\tau_e$ improves the signal-to-noise ratio and improves the sensitivity to audio signals coming along the direction of the linear array.

If we consider an incoming acoustic signal with an incidence angle θ (referred to the sub-system axis), and assuming a harmonic signal of frequency f [Hz] (or pulsation ω=2·π·f), the "acoustic delay" between the two microphones is $\tau_d$=(d·cos θ)/c [s] (where c is the celerity of sound in air) and the resulting output voltage $\underline{U}$ [V] of the sub-system is dependent on the incidence angle θ [rad]:

$$\underline{U}=\underline{U}_1-\underline{U}_2 e^{(-j\omega\tau_e)}=\underline{M}_1\underline{p}_1(1-e^{-j\omega(\tau_e+\tau_d\cos\theta)}) \cong \underline{M}_1\underline{p}_1 j\omega(\tau_e+\tau_d\cos\theta) \quad (1)$$

where $\underline{M}_1$ [V/Pa] is the sensitivity of the first microphone, $\underline{p}_1$ [Pa] the acoustic pressure of a plane wave at the first microphone, $\tau_e$ [s] the delay applied to the second microphone and $\tau_d$ the propagation time from the first to the second microphone. With $\tau=\tau_e+\tau_d$ and $\mu=\tau_d/\tau$, we finally have the sensitivity $\underline{M}$ of the sub-system:

$$\underline{M} = \frac{\underline{U}}{\underline{p}} \cong \underline{M}_1 j\omega[(1-\mu)+\mu\cos\theta] \quad (2)$$

which is the characteristics of a directive microphone of first order.

From this equation, one sees that the frequency response corresponds to a high-pass filter with a slope of +6 dB/octave. This means that the sensitivity decreases in the low-frequency range, which may be disadvantageous.

Figure 3:
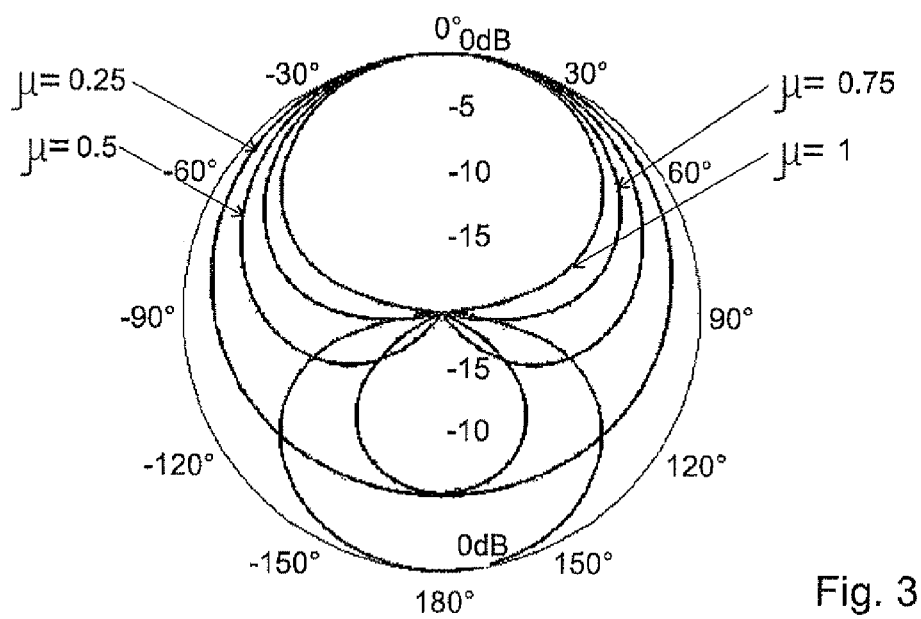
FIG. 3 is a diagram that shows the influence of p on the directivity pattern of a 1st order sub-system of microphones.

By setting μ=0.5, we obtain a cardioid directivity of the microphone array, and with μ=1, a bidirectional microphone. FIG. 3 shows the characteristic directivity patterns for different values of μ.

Figure 4:
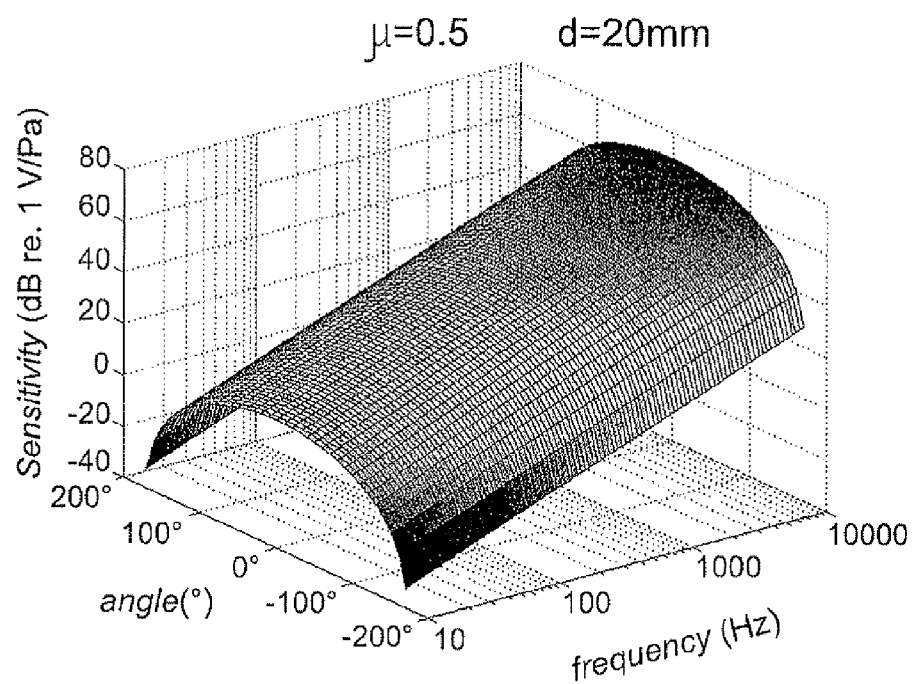
FIG. 4 is a diagram that shows the dependence of the sensitivity of a 1st order differential array with angle and frequency.

The directivity is highly frequency-dependant as illustrated by FIG. 4. To ensure a constant directivity pattern on the whole frequency bandwidth, different pairs of networks with different distances between microphones inside the pairs, and different frequency limitations, are combined in the microphone arrays 24, 25.

The microphone arm of the invention thus uses several pairs of microphones which are arranged along the same axis to get a more directive array (in the axis of the array). Each array is thus monodimensional and comprises a plurality of pairs all arranged in one row.

By combining two first-order differential arrays and after introducing an additional time delay, a general second-order differential microphone array can be constructed. The overall sensitivity of such a system can be computed by multiplying the sensitivities of the sub-systems involved, leading to enhanced directivity with two sub-systems in cascade than with only one, but with the drawback of a $2^{nd}$ order high-pass filter behavior. By choosing the dimensions of each sub-system, broader frequency bandwidths can be covered with constant directivities and sensitivities, thus building differential arrays.

Figure 5:
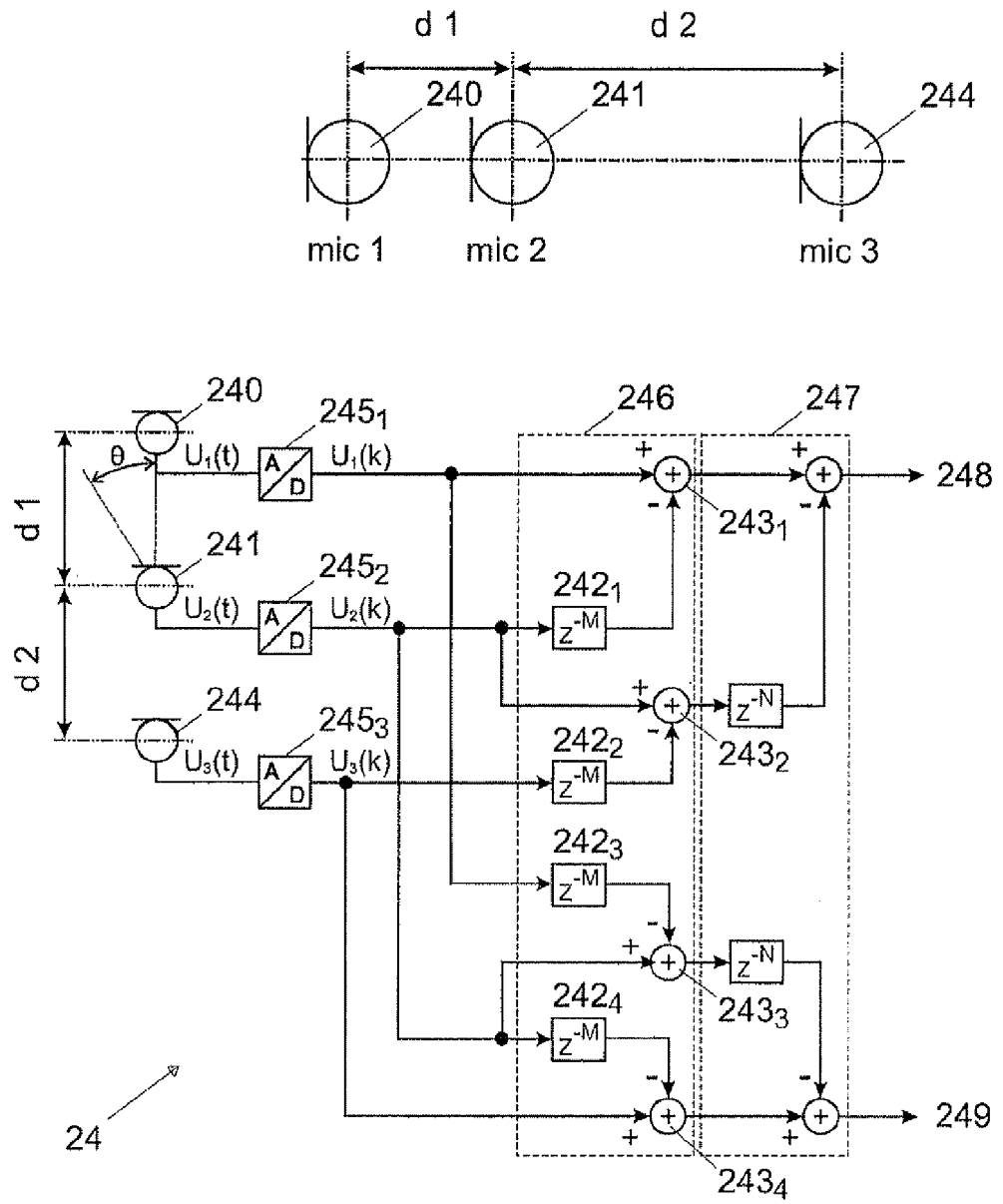
FIG. 5 schematically illustrates a second order differential array.

A differential array is described by its order, i.e. the number of the "stages" of delays, as described on FIG. 5 for one second order array 24. In this example, the array comprises N=3 microphones arranged in four pairs: {1; 2}, {2; 3}, {2; 1}, {3; 2}. The first digit of each pair refers to the "+" sign and the second digit to the "−" sign of the adding elements 242$_1$ to 242$_4$ of FIG. 5. The distances $d_i$ between successive microphones within the pairs are variable.

The analog signal u1(t), ui(t), ..., uN(t) at the output of each microphone 240, 241, 244 is converted into a digital signal by respective analog-to-digital converters 245$_1$, 245$_2$, 245$_3$. For each pair, a first processing stage 246 then performs the digital algebraic addition between one signal and the delayed signal from the other microphone of the pair. A second processing stage 247 then performs the algebraic addition between the output of one adding element 243 and the delayed output of another adding element of the first stage. The first digital signal delivered by this second stage forms a front beam signal 248, while the other digital signal delivered by this second stage forms a back beam signal 249.

In theory, one can combine as many pairs as wanted, but in practice, it is difficult to go further than a second-order array. This is mainly due to the fact that a differential array is a differentiating array (high-pass filter) of the same order as the order of the array, which means the low frequencies of the signal are highly attenuated and decreasing by the way the signal to noise ratio. There is thus a trade-off to be found regarding the dimensions of each array, the order of the array, the frequency bandwidth of interest, and the number of channels available for signal processing.

The microphone arm of the device 1 is arranged for detecting sound not only from the useful direction (direction of the mouth), but also from at least one other direction, corresponding to noise. A better knowledge of the noise coming from different directions allows to perform the extraction of the useful signal and the rejection of the noise signal, using coherence techniques. It allows also to improve the efficiency of the subsequent post-filtering.

In one embodiment, the microphone arm 23 of the present invention advantageously comprises a two dimensional microphone array (rather than a one dimensional array like the one described up to now). This two-dimensional array is made up of two one-dimensional arrays, as illustrated on FIG. 7. A first array 24 is arranged on the first, longest leg of the L-shaped arm 23, while the second array is arranged on the other, shortest leg of the same arm. This second transversal microphone array is used for improving cancellation of the interfering noise.

As mentioned, this L-shaped arm is orientable, by rotations around the axis of one of the two legs (here the shortest), so that the user can adjust the position to an optimal (in front of the mouth). When the arm 23 is correctly orientated, the longest leg (in this example) senses the useful front signal from the direction of the speaker's mouth, as well as noise from the rear. The second leg (here the shortest, but not necessarily) senses diffuse noise from the left and from the right directions.

In the illustrated setting, the orientation of the second leg remains essentially unchanged when the arm is rotated; there is only one degree of freedom for orientating the first leg in the direction of the user's mouth.

In a preferred embodiment, the two legs are perpendicular to each other; other arrangements are however possible.

Each leg is equipped of at least one linear differential array of microphone.

In another embodiment, the microphone is U-shaped and comprises two legs connected by a third leg, preferably but without limitations perpendicular to the two first legs.

The device of the invention may further use additional microphones or microphone arrays, including non orientable microphones or microphone arrays on the case of the device for capturing background noise from different directions.

Furthermore, microphones of different legs may be paired to provide additional sensing of the diffuse noise along other directions.

Figure 8:
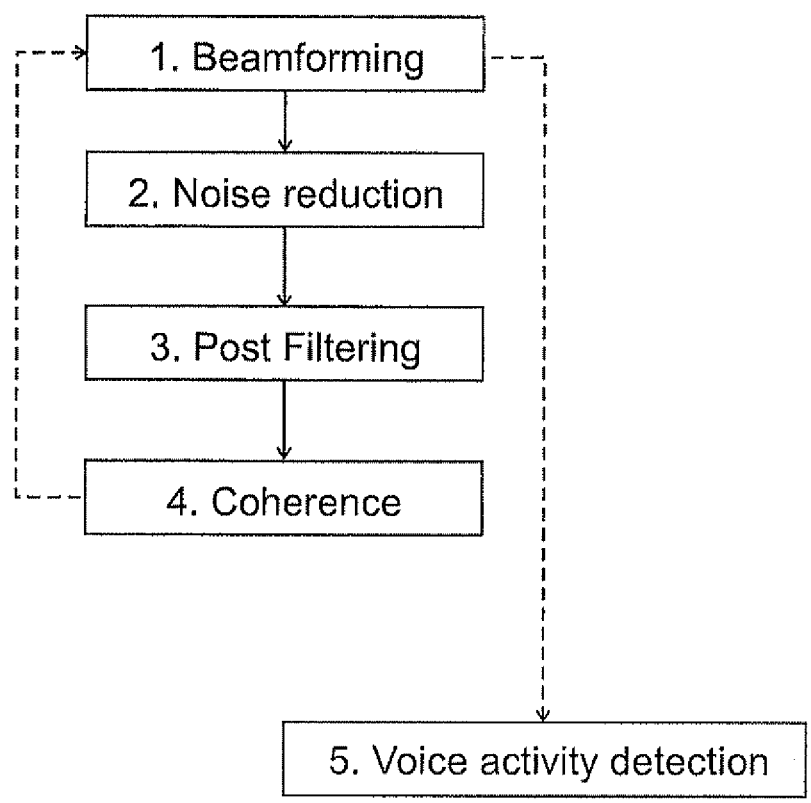
FIG. 8 is a flow diagram illustrating one possibility of combining various filters and methods used after the beamforming for post-processing in order to enhance voice and/or damp noise.

FIG. 8 is a flow diagram illustrating one possibility of combining various filters and methods used after the beamforming for post-processing in order to enhance voice and/or damp noise.

Referring to FIG. 8, in a first step, beamforming methods (as above described) are applied for reducing noise and controlling directivity, by computing algebraic additions between signals delivered by different microphones or subsystems of microphones.

One of the signals delivered by the microphone arrays, let say beam signals, contains mainly the user's voice while the signals of the other microphone arrays contain mainly noise. In a preferred embodiment, the front beam contains the user's voice while the back, left and right beams contain signals from noise sources. The different signals delivered by the different arrays on the microphone are then post-processed in order to deliver a voice signal with a better signal to noise ratio and suitable as input for a speech recognition software. The steps following the beamforming could be performed in an order different from the one illustrated in FIG. 8.

The post-processing may include an estimation of noise spectral characteristics over a certain time slice. This module may operate on beams with background noise and/or the beam with voice. In the latter case, it has to be done while the user is not speaking. The time needed to perform the noise spectral characteristic may vary depending on the application; in order to address real-time applications like order-taking in restaurants, computation of a noise estimate needs to be done when the user 2 commands the order, i.e., a fraction of a second before the user starts speaking.

The post-processing may include a Wiener filter performing a subtraction from the voice beam spectrum of the noise spectrum, estimated either for the voice beam and/or the noise beams.

The post-processing may include a post-filtering stage in which the voice beam spectrum is compared to the spectra of other beams at various frequencies and is damped and/or cleared at theses frequencies where it is not higher than k times the highest among noise beam spectra.

The post-processing may include a filtering of the voice beam based on a measure in the spectral domain of its coherence with the microphone which is the closest to the speaker's mouth. The voice beam spectrum is damped and/or cleared at theses frequencies where the coherence with the microphone spectrum is low.

In another embodiment the post-filtering stage implies a comparison, in the frequency domain, of the four signals delivered by the microphone array (front, back, left, right), computed by the beamforming phase and denoised by the noise reduction phase using an adaptive filters based on a modified DUET (Degenerate Unmixing Estimation Technique). For each channel of the beamformer, these adaptive filters allow decreasing the influence of the noise in the front channel, by spectral subtraction of the signals of the three other channels that are basically sensing noise.

In another embodiment the post-filtering stage implies a coherence computation which is performed between the front signal delivered by the beamformer and the result of the post-filtering, in order to filter out residual signals that do not come from the speaker. Two signals are coherent if one is a scaled and delayed version of the other.

The post-filtering stage may imply a Voice Activity Detector (VAD) for detecting when the user is speaking. The voice detection is preferably done by analysis of the power signal.

In one embodiment the Voice Activity Detector is multi-layer and integrated in the device (built-in multi-layer VAD). It can have at least one of the following means:

"Speech-keeping" means: allow to avoid or limit the cancellation of the start and/or the end of the speech and to avoid or limit cuts in the speech that might be produced as a consequence of the VAD thresholds. When the measured signal energy goes above a certain level, the system considers that speech is present. To avoid missing the start of the speech which might be under the VAD thresholds, the VAD do not cancel a parameterized duration before the speech detection (the system transmits the recording with a small delay to allow to make such decision). To avoid cuts and/or missing the end of the speech, the VAD thresholds are deactivated while the system is in presence of speech. They are activated again when the speech remains under the VAD thresholds for a given parameterized duration.

Noise estimate means: allow to determine the level of noise. The time needed to perform the noise estimate may vary depending on the application, but can already be done in a fraction of a second to address real-time applications like order-taking in restaurants. In this case, the noise estimate is done when the user 2 commands the order, a fraction of a second before he/she starts speaking.

Relative VAD means: sets the level above which sound is considered as speech according to the noise estimate. Sound is considered as speech when it reaches n times the level of the noise determined with the noise estimate. This is used to remove the noise and any variations of noise which can be above the noise estimate but remains under n times such noise estimate.

Absolute VAD means: Sets an absolute level above which sound is considered as speech. This is used for cancelling small noises like the touch of a screen, little music or some small noises in the background.

The decision of speech presence with relative and absolute VAD means is made on a short-time basis, typically 10 ms, to avoid short interruption in speech when a minimal cancellation duration is required in order to take cancellation into account. This constraint is relaxed in situations of speech start and speech end.

The absolute VAD is specially needed when there is little noise, since the relative VAD might not set the threshold at a level which allows to cancel some variations of noise.

In one embodiment the Relative VAD could also be computed in a non linear way. For example, if the level of noise estimate is very high, as in the case of a very noisy restaurant, the value of n could be smaller than when the level of noise estimate is low.

In another embodiment the embedded VAD system could include multiple absolute and relative VAD thresholds which can be activated or deactivated depending on some application criteria.

This device may be used for example for voice-order taking applications and speech recognition applications in restaurants, bars, discotheques, hotels, hospitals, entertainment industry, groceries, etc.

The invention claimed is:

1. A hand held voice capture device comprising:
an orientable arm, comprising
a first leg and a second leg,
said first leg and said second leg having different orientations, said first leg of said arm comprising a first differential linear array of microphones, a directivity of said first differential linear array being arranged for improved sensing of voice from a user;

said second leg of said arm comprising a second differential linear array of microphones, a directivity of said second differential linear array being arranged for improved sensing of noise from a different direction than the direction of said sensed voice;

and a noise reduction circuit for providing a voice signal with reduced noise, based on an output of said first differential linear array and on an output of said second differential linear array, wherein either one of said first differential linear array of microphones or said second differential linear array of microphones comprises at least two microphones spaced by distance d, each array forming a beamforming system, and wherein an output signal of at least one microphone in said first differential linear array of microphones or said second differential linear array of microphones being algebraically added with an adding element to a delayed output signal of the other microphone spaced by a distance d.

2. The device of claim 1, wherein said noise reduction circuit is based on coherence techniques for removing noise from the output of said first differential linear array.

3. The device of claim 1, comprising a rotatable link for rotating said orientable arm around the axis of one of said legs.

4. The device of claim 3,
said arm being L shaped,
the first differential linear array being arranged on a first leg and the second differential linear array on a second leg of said L-shaped arm,
wherein said orientable arm can be rotated around an axis parallel to one of said legs.

5. The device of claim 3, said orientable arm being U shaped and comprising three arrays of microphones.

6. The device of claim 1, further comprising:
data processing means;
a display;
a wireless communication interface;
a Wiener Filter for noise reduction; and
a voice activity detector.

7. The device of claim 6, the voice activity detector being a built-in multi-layer voice activity detector comprising at least one of the following means noise estimate means; absolute voice activity detector means;
relative voice activity detector means; and
speech-keeping means.

8. The device of claim 1, operatively connected to a user dependant speech recognition module.

9. The device of claim 8, said user dependant speech recognition module comprising a grammar and a dictionary adapted for "command and control" applications, and/or for order taking in restaurants.

10. A system comprising a portable digital assistant as a hand held voice capture device according to claim 1, with an orientable arm being a removable external add-on mounted on said portable digital assistant.

11. A system comprising a portable digital assistant as a hand held voice capture device according to claim 1, with an orientable arm being wirelessly connected to said portable digital assistant.

12. A method for capturing voice, comprising:
capturing a voice signal with a first differential linear array of microphones mounted on a first leg of an orientable arm of a hand held device, said orientable arm being directed toward the mouth of a user;
capturing noise from at least one direction different than the direction of said voice signal, using a second differential linear array of microphones mounted on a second leg of said orientable arm, said first and second legs having different directions; and
reducing noise from said voice signal, using an output of said first differential linear array and of said second differential linear array,
wherein either one of said first differential linear array of microphones or said second differential linear array of microphones comprises at least two microphones spaced by distance d, each array forming a beamforming system, and
wherein an output signal of at least one microphone in said first differential linear array of microphones or said second differential linear array of microphones being algebraically added with an adding element to a delayed output signal of the other microphone spaced by a distance d.

13. The method of claim 12, wherein said first and second differential linear arrays of microphones capturing speech at a distance to the mouth greater than 15 cm in noisy condition.

* * * * *